US 11,176,158 B2

(12) United States Patent
Freed et al.

(10) Patent No.: US 11,176,158 B2
(45) Date of Patent: Nov. 16, 2021

(54) INTELLIGENT USE OF EXTRACTION TECHNIQUES

(71) Applicant: International Business Machines Corporation, Armonk, NY (US)

(72) Inventors: Andrew R Freed, Cary, NC (US); Jason H Cornpropst, Raleigh, NC (US); Aaron T Smith, Raleigh, NC (US); Barton W Emanuel, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 16/527,734

(22) Filed: Jul. 31, 2019

(65) Prior Publication Data
US 2021/0034637 A1 Feb. 4, 2021

(51) Int. Cl.
*G06F 16/00* (2019.01)
*G06F 16/25* (2019.01)
*G06F 16/93* (2019.01)
*G06F 16/2458* (2019.01)
(Continued)

(52) U.S. Cl.
CPC ........ *G06F 16/254* (2019.01); *G06F 16/2465* (2019.01); *G06F 16/93* (2019.01); *G06F 40/279* (2020.01); *G06F 40/30* (2020.01); *G06F 2216/03* (2013.01)

(58) Field of Classification Search
CPC .... G06F 16/254; G06F 16/93; G06F 16/2465; G06F 40/30; G06F 40/279
See application file for complete search history.

(56) References Cited

U.S. PATENT DOCUMENTS

| 6,999,959 | B1* | 2/2006 | Lawrence | ............. G06F 16/951 |
| 7,739,215 | B2 | 6/2010 | Horvitz et al. | |
| 9,135,633 | B2 | 9/2015 | Eskey et al. | |

(Continued)

OTHER PUBLICATIONS

FormScape announces packaged solution for distribution operations; Reduces costs and optimizes processes associated with document management Publication info: M2 Presswire (Sep. 16, 2002).

(Continued)

*Primary Examiner* — Leslie Wong
(74) *Attorney, Agent, or Firm* — Jeffrey S LaBaw; Steven J Meyers

(57) ABSTRACT

A set of documents is received for processing and extraction. A set of processing engines is received, and each processing engine has an expected benefit when processing a document with associated document metadata. The set of documents is analyzed to determine document metadata to be associated with the document. An expected benefit is determined for each of the documents of the set of document when the respective document is processed by a respective processing engine in the set processing engines. An expected cost for processing is determined for each of the documents in each of the set of processing engines. A processing plan for the set of documents is determined wherein the processing plan identifies a selection of documents to be run in respective processing engines of the set of processing engines based on a cost versus benefit analysis. The processing plan is executed extracting information from the identified selection of documents.

20 Claims, 8 Drawing Sheets

(51) Int. Cl.
*G06F 40/30* (2020.01)
*G06F 40/279* (2020.01)

(56) References Cited

U.S. PATENT DOCUMENTS

| | | | |
|---|---|---|---|
| 9,286,290 | B2 | 3/2016 | Allen et al. |
| 9,483,455 | B1 | 11/2016 | Bastide |
| 9,715,491 | B2 | 7/2017 | Stollman |
| 9,720,945 | B2 | 8/2017 | Bastide |
| 2004/0243557 | A1* | 12/2004 | Broder .................. G06F 40/30 |
| 2012/0324449 | A1 | 12/2012 | Huetter |
| 2014/0156345 | A1* | 6/2014 | Eskey ................... G06Q 30/02 705/7.29 |
| 2014/0280284 | A1* | 9/2014 | Emanuel ............... G06F 16/951 707/766 |
| 2014/0372483 | A1* | 12/2014 | Marmanis ........... G06F 16/3325 707/776 |
| 2015/0081281 | A1* | 3/2015 | Bustelo ................. G06F 40/284 704/10 |
| 2015/0356456 | A1 | 12/2015 | Dubbels |
| 2016/0364388 | A1* | 12/2016 | Balasubramanian ...................... G06F 21/6227 |
| 2017/0024463 | A1 | 1/2017 | Bastide et al. |
| 2018/0268448 | A1 | 9/2018 | Simantov et al. |
| 2019/0095802 | A1* | 3/2019 | Raphael ............. G06Q 30/0283 |
| 2020/0192920 | A1* | 6/2020 | Filonov ................ G06F 16/313 |

OTHER PUBLICATIONS

Metalearning, Tom Schaul and Juergen Schmidhuber, Scholapedia Article, downloaded Jul. 30, 2019, (2010).

* cited by examiner

|  | LOCAL RULES-BASED NLP 801 | CLOUD ML-BASED NLP 803 | CLOUD TABLE EXTRACTION ENGINE 805 |
|---|---|---|---|
| MEMO 807 | PLANS (A)(B)(C) 817 | PLANS (A)(B)(C) 819 | PLANS (A)(B)(C) 821 |
| MEMO 809 | PLANS (A)(B)(C) 823 | PLANS (A)(B)(C) 825 | PLANS (A)(B) 827 |
| APPRAISAL 811 | PLANS (A)(B)(C) 829 | PLANS (A)(B)(C) 831 | PLANS (A)(B)(C) 833 |
| APPRAISAL 813 | PLANS (A)(B)(C) 835 | PLANS (A)(B) 837 | PLANS (A)(B) 839 |
| NEWS CLIPPING 815 | PLAN (A) 841 | PLAN (A) 843 | PLAN (A) 845 |

*FIG. 8*

INTELLIGENT USE OF EXTRACTION TECHNIQUES

BACKGROUND OF THE INVENTION

This disclosure relates generally to data mining. More particularly, it relates to selecting from among available extraction and other data processing techniques to mine information from a set of documents.

Cognitive expert advisor systems need to use a variety of extraction and processing techniques to provide the best possible advice to their users.

While one approach is to provide all of the extraction techniques by programming written by individuals within the organization, like other information technology industries, there are specialists in data extraction techniques. Thus, in another approach to provide expert advisor systems, at least some extraction and processing techniques are provided by one or more external services and these services come with a cost. A naive approach is to use every available technique on every document. However, this could produce an astronomical services bill. Internal services may be available or in time could be developed. However, internal processing or contracted cloud-based processing may be limited or devoted to other tasks.

This is a complicated task.

Improvements in maximizing the value and amount of data extracted and processed are needed.

BRIEF SUMMARY

According to this disclosure, a method, apparatus and computer program product for determining a processing plan for a set of documents. The set of documents is received for processing and extraction. The set of processing engines is received, and each processing engine has an expected benefit when processing a document with associated document metadata. The set of documents is analyzed to determine document metadata to be associated with the document. An expected benefit is determined for each of the documents of the set of document when the respective document is processed by a respective processing engine in the set processing engines. An expected cost for processing is determined for each of the documents in each of the set of processing engines. A processing plan for the set of documents is determined wherein the processing plan identifies a selection of documents to be run in respective processing engines of the set of processing engines based on a cost versus benefit analysis. The processing plan is executed extracting information from the identified selection of documents.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 8 depicts a simplified embodiment of the invention having five documents, three processing engines, and three processing ingestion plans.

DETAILED DESCRIPTION OF AN ILLUSTRATIVE EMBODIMENT

At a high level, the invention provides a method, system and computer program product for optimizing extraction and processing of a set of documents given a set of internal and external services. In an embodiment of the invention, for every document to be processed by the system, an "information gain" algorithm evaluates the expected benefit of sending that document to each service and evaluate that benefit against the service's cost. In other embodiments, other benefits are added to a cumulative expected benefit. The expected benefit calculated for a given document uses document characteristics such as type, content, size, formatting, and quality of the document as well as historical data for the information gain from similar documents for each of the services. Similarity between the content of different documents may result in a decision to only process one of the documents, if an incremental information gain from processing a second document is below a threshold. Costs that are considered include time, processing power for internal services, security needs and a monetary cost for external services. Thresholds for one or more cost criteria are used in embodiments of the invention. One or more cost optimization plans are executed to decide which documents go to which service(s). The result is an extraction plan that maximizes the value for a document set for a given purpose.

Embodiments of the invention allow the user to be selective in using the external services yet optimize the expected information gain for the user. For each document, different techniques will be more useful than others in terms of extracting more valuable information. Further, embodiments of the invention determine a processing plan for a particular goal, or for a set of goals based on the type(s) of information desired, its characteristics, format and so forth. The choice of the extraction technique, whether the extraction technique should be developed in-house, or which vendor should be selected, while minimizing the services bill are addressed in different embodiments of the invention.

Figure 1:
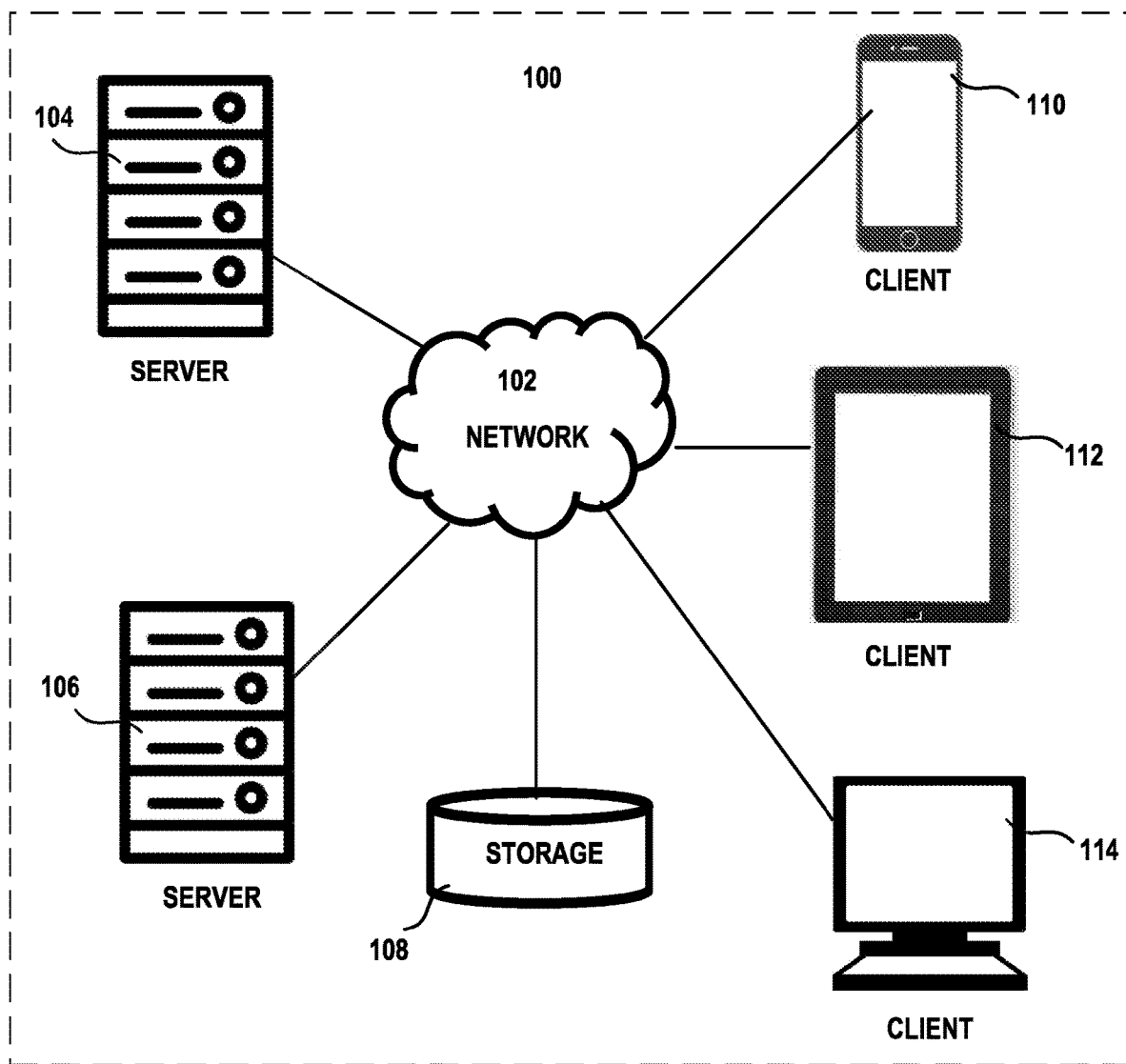
FIG. 1 depicts an exemplary block diagram of a distributed data processing environment in which exemplary aspects of the illustrative embodiments may be implemented.
Figure 2:
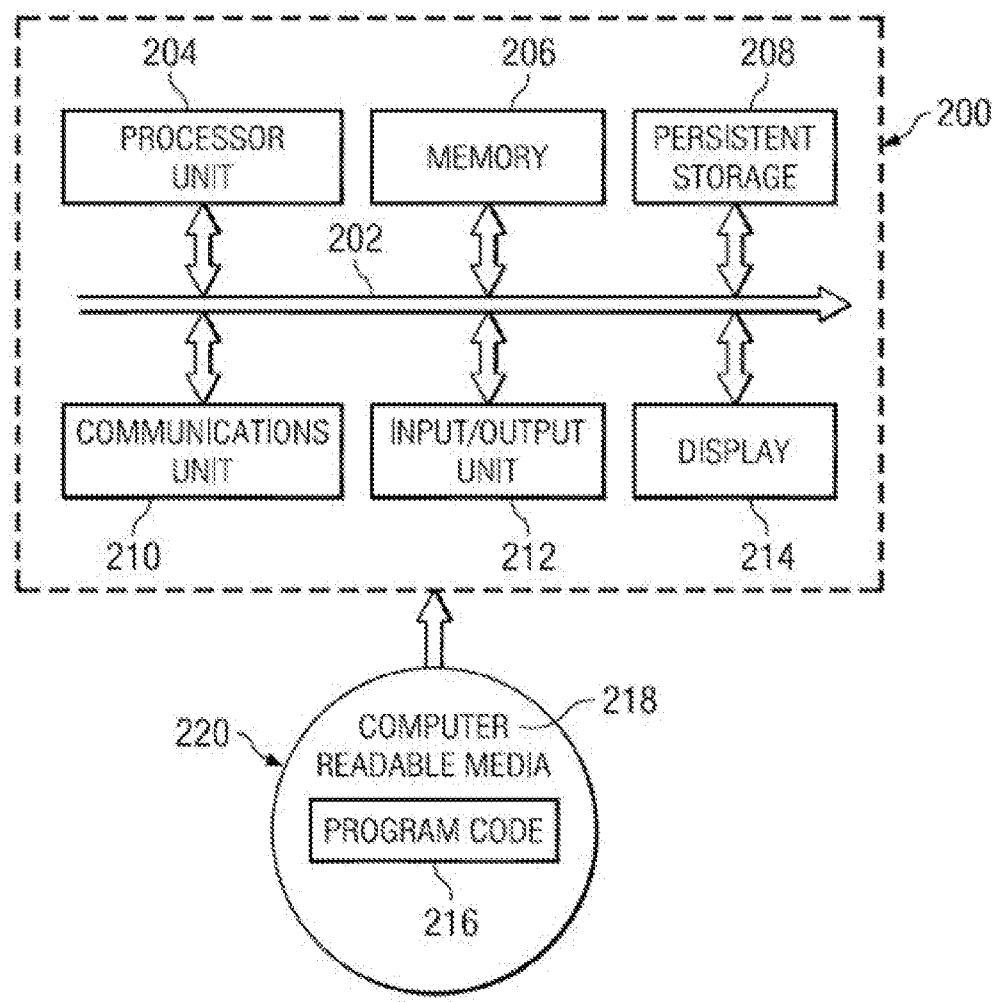
FIG. 2 is an exemplary block diagram of a data processing system in which exemplary aspects of the illustrative embodiments may be implemented.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments. With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212 and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Figure 3:
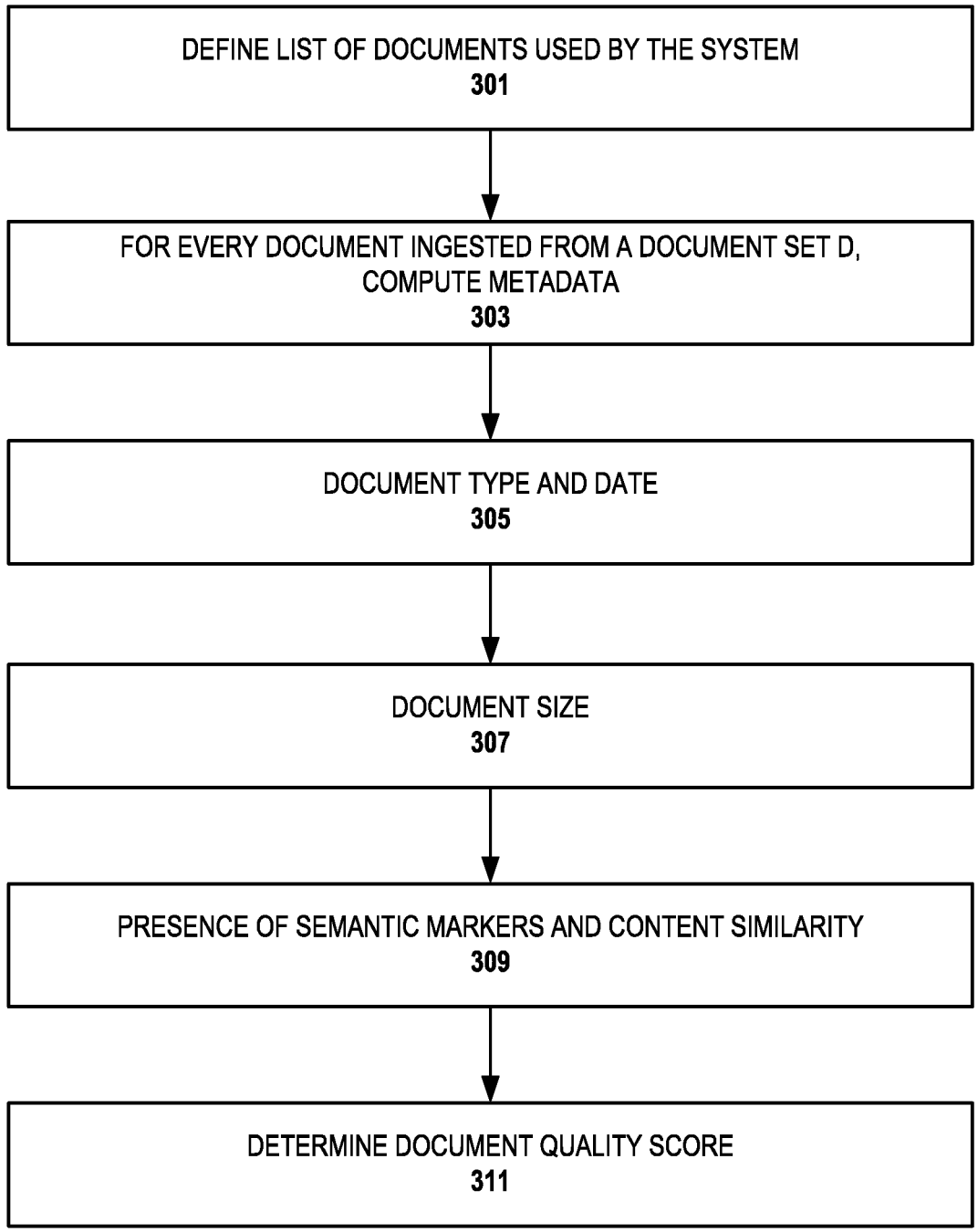
FIG. 3 is a flow diagram for determining the document metadata and quality score for a set of documents in one embodiment of the invention.

FIG. 3 is a flow diagram for determining the document metadata and quality score for a set of documents in one embodiment of the invention. In step 301, the system defines the list of documents available for the present task. In step 303, for every document which is processed from the document set D, document metadata is created. The metadata includes document type and date, step 305, and document size (bytes, pages, etc.) and content, step 307. Both the document type and document date are valuable for predicting the information gain in applications of the invention. Document type and size are valuable for predicting a cost of processing. The use of natural language processing, step 309, establishes the presence of semantic markers and document similarity based on content and other characteristics such as type and source of the document. Semantic markers such as <paragraph> and <table> tags are useful for estimating costs as well as selecting appropriate processing engines. Though illustrated as three steps, one skilled in the art will recognize that establishing the metadata can be accomplished in additional or fewer steps and that the greater number of types of metadata created, the greater number of process steps are likely used in an embodiment. In embodiments of the invention, a history of the document attributes is kept and if documents having a certain set of attributes recur, the set of attributes is marked as a candidate for an in-house processing engine. The types of metadata are exemplary and not exclusive.

Finally, in step 311, the system determines a document quality score for each document. The document quality score is a measure of the likelihood that useful information can be extracted from the document. For example, where the document contains OCR noise, the document quality score will be lower. Where the document contains recognized words, the document score will be higher. For certain goals and objectives, the individual recognized words and their meanings will have an impact on the document quality score as compared to merely that document contains recognizable words. Further, in embodiments of the invention, a set of document scores is calculated, one for each of the processing/extraction engines available to the system and if the set of documents are to be evaluated for a set of goals, one for each of the goals as well. A document score for an individual processing or extraction engine is based on historical data for similar documents. A document score for a goal is based on the meaning of the recognized words, e.g., selecting documents having to do with the goal subject. In alternative embodiments, a machine learning (ML) algorithm using metadata features of document (document type, size, etc.) and of the cost characteristics of the respective services (cost per document, benefits of the service, etc.) is used to determine an optimal selection of services. Although the process is illustrated as a batch process in the drawing, one skilled in the art will recognize that the steps can be performed sequentially for each document in turn and return for the next document.

Figure 4:
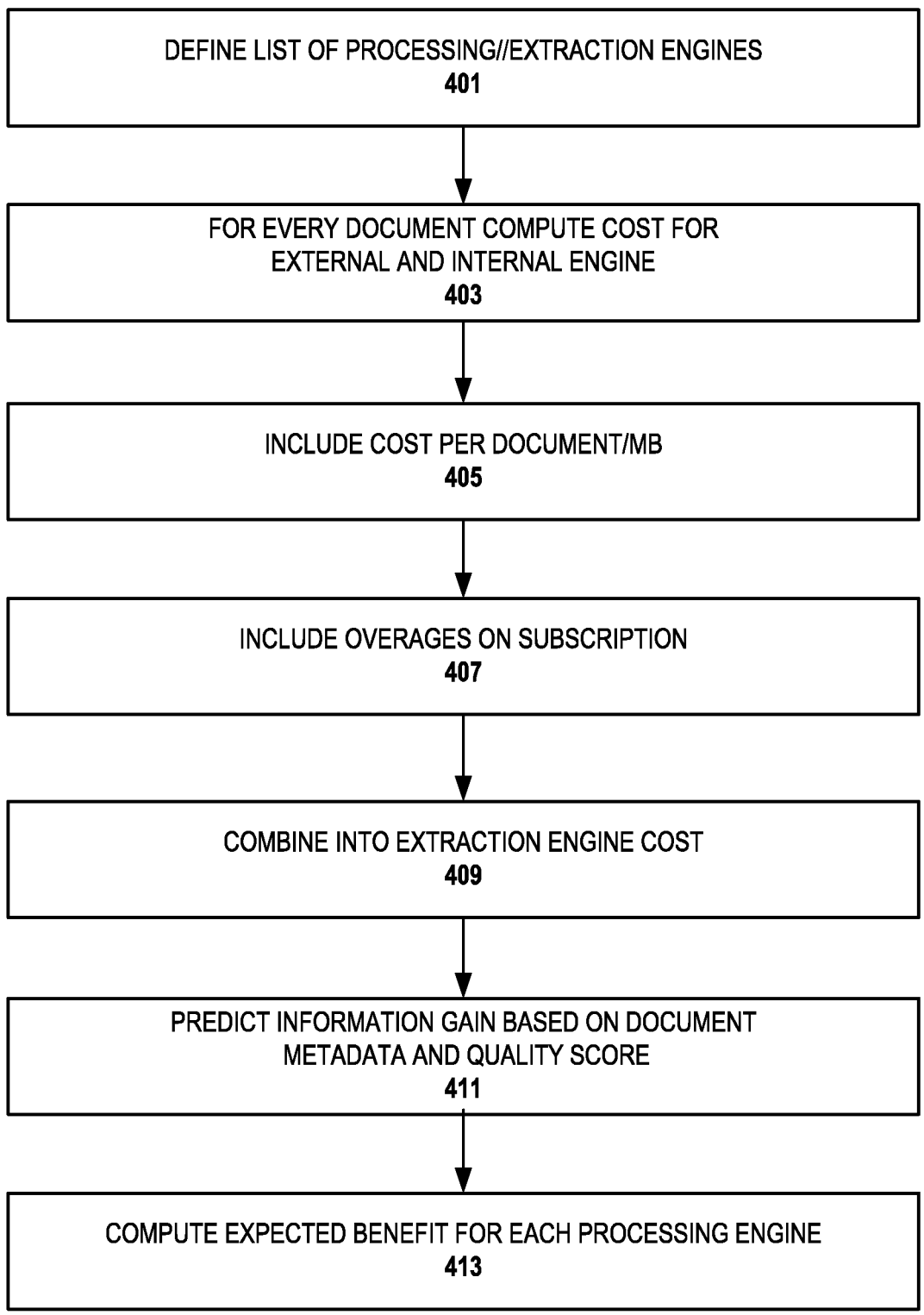
FIG. 4 is a flow diagram for estimating an expected benefit for each processing engine for each document.

FIG. 4 is a flow diagram for estimating an expected benefit for each processing engine for each document in one embodiment of the invention. In some embodiments of the invention, the expected benefit, e.g., information gain, is determined for processing the set of documents for a single goal, but in other embodiments, the expected benefit is determined so that the set of documents can be used for a plurality of goals. Further, individual goals may have different priorities so that processing a document which has a high expected benefit for a first goal with a high importance will take precedence over processing a document with an equally high expected benefit for a second goal with a lower importance.

In step 401, the system defines the list of processing and extraction engines used by the system. While the distinction between processing and extraction engines is inexact, the inventors include extraction engines within the broader range of processing engines in their invention as sometimes the document will require some preprocessing before extraction can occur. The preprocesing alone does not produce any insights into the data and would be followed by an extraction process which can be viewed as subgroup of the processing techniques. IBM Watson™ Discovery product is an example of a processing engine and extraction engine combined. The Optical Character Recognition (OCR) process of taking images and converting them to text is a processing engine and then the Natural Language Processing (NLP) part of IBM Watson™ Discovery that extracts entities from the processed text is an extraction engine. This list includes both the external and internal engines in some embodiments of the invention. Step 403 computes the expected cost for every document for each external and internal engine. While external engines cost the organization primarily a cost in dollars (or other currency), there may be costs in time and effort in formatting the set of documents for the external engine as well as assimilating the returned results. The internal engines also cost the organization in terms of time and use of available processing power. In embodiments of the invention, the costs of the internal engines are normalized into "dollar" terms, though the dollar terms represent physical limitations of the internal or external processing. As many "internal" engines are currently resident in a commercial cloud provider, there may be a cost in dollars associated with hosting the internal engines. Other costs that can be considered in embodiments of the invention include a time dependency, i.e. the availability of the external and internal engines to produce the information gain from the set of documents.

In step 405, the cost per document/MB (or/another parameter) is calculated. This is useful information in determining whether the document should be optimized. That is, if the document is very large, but valuable in terms of the information gain, it would be a candidate for optimization. This is discussed below.

In step 407, as part of the calculation of the cost of processing the document, the system includes overages on the subscriptions that the organization has with the external providers or with the cloud provider with which the organization has contracted its internal operations. In step 409, all the costs are combined into an extraction or processing engine cost. In step 411, the system predicts the information gain based on document metadata and quality score for each of the extraction and processing engines. For example, an external engine may have a higher expected information gain, but also have a higher cost than an internal engine. Based on the costs and benefits (e.g., in terms of information gain), step 413, the system computes the expected benefit for each external and internal processing engine. Though the external engine may have a higher expected information gain, according to a threshold or an overall cost threshold, the use of internal engine may be judged "good enough" for a particular document. The system may use a heuristic by document classification. Documents of a given type are more likely to provide certain attributes. Another heuristic is date based. Older documents will provide less value if a newer document of the same type and content supersedes them. Similarly, heuristics for document quality and other document 'importance' features such as semantic meaning of certain recognized words for a particular goal are used in embodiments of the invention to predict an information gain. In embodiments of the invention, the expected information gain or other benefit is based on a number of expected useful attributes extracted from a given document.

Alternative embodiments of the invention use a rules approach, or a machine learning model based on the criteria discussed above.

Figure 5:
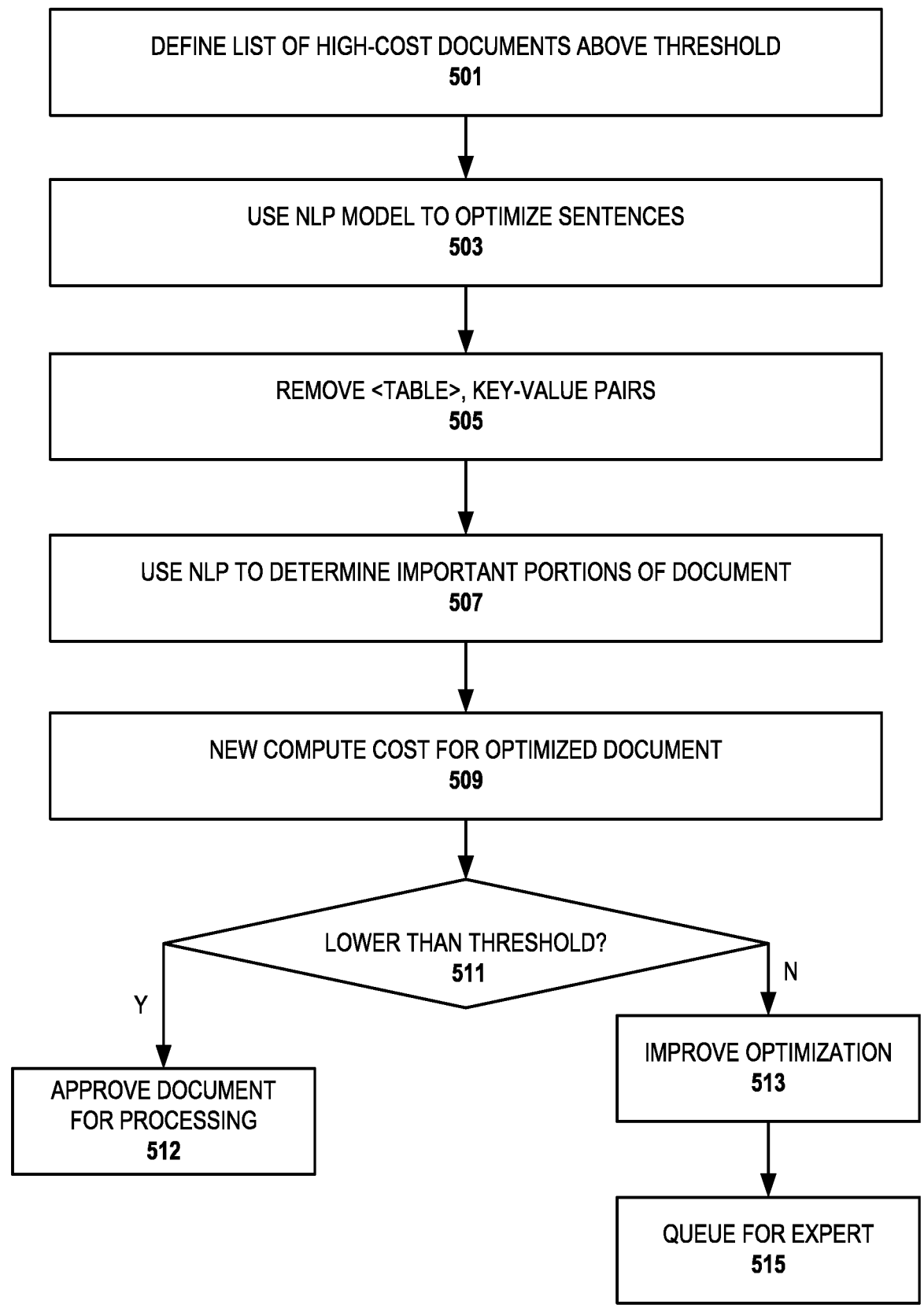
FIG. 5 is a flow diagram for estimating an expected benefit for optimizing each high cost document for each processing engine.

FIG. 5 is a flow diagram for estimating an expected benefit (e.g., an information gain) of optimizing each high cost document for one or more processing engines and selecting ones of the documents for processing. In step 501, a list of high-cost documents above a cost threshold is established. In preferred embodiments, it established by a process like that described in FIG. 4. In embodiments of the invention, the document is optimized for a particular extraction or processing engine. For example, when the system predicts that a document should be processed by a particular extraction or processing engine, there may be particular rules or processes that should be applied for the engine. Further, the system may determine that different portions of the document should be processed by different engines. Thus, the description below is modified according to the particular rules or processes for different documents or respective sections of a document.

In step 503, the system uses a natural language processing (NLP) model to predict whether to optimize sentences. The NLP model can be different for different extraction or processing engines. In step 505, the system predicts the value of removing <table>, key-value pairs or other document content. As another example, sections with "sentences" less than S words long are removed. As another example, long documents with a known format may have certain "high-value" sections, e.g., a table-based conclusion at the beginning and a text-based conclusion at the end. A remainder of the document can be deleted. Further, a high value document can be divided into sections and different sections sent to different extraction and processing engines. As yet another example, repetitive content may be of less value in terms of information gain so that after a first occurrence in a document, the repetitive content is deleted. In step 507, the system uses NLP to determine important portions of document. Based on the processing, step 509, a new cost for the optimized document is determined. The new cost can be determined for either the predicted "best" (e.g., highest predicted information gain) processing engine or for all the extraction and processing engines.

In step 511, the system determines whether the cost is lower than the cost threshold. If so, the system approves the optimized document for processing by one or more of the processing engines. If not, in step 513, the system repeats the optimization process, e.g., by optimizing (e.g., removing) additional portions of the document or optimizing the document according to additional rules. If the additional optimization is not successful, i.e. does not reduce the cost below the cost threshold, step 515, the document is queued for subject matter expert approval as a candidate document for a processing engine. If the expert approves, the document is transmitted to the processing engine for processing.

Figure 6:
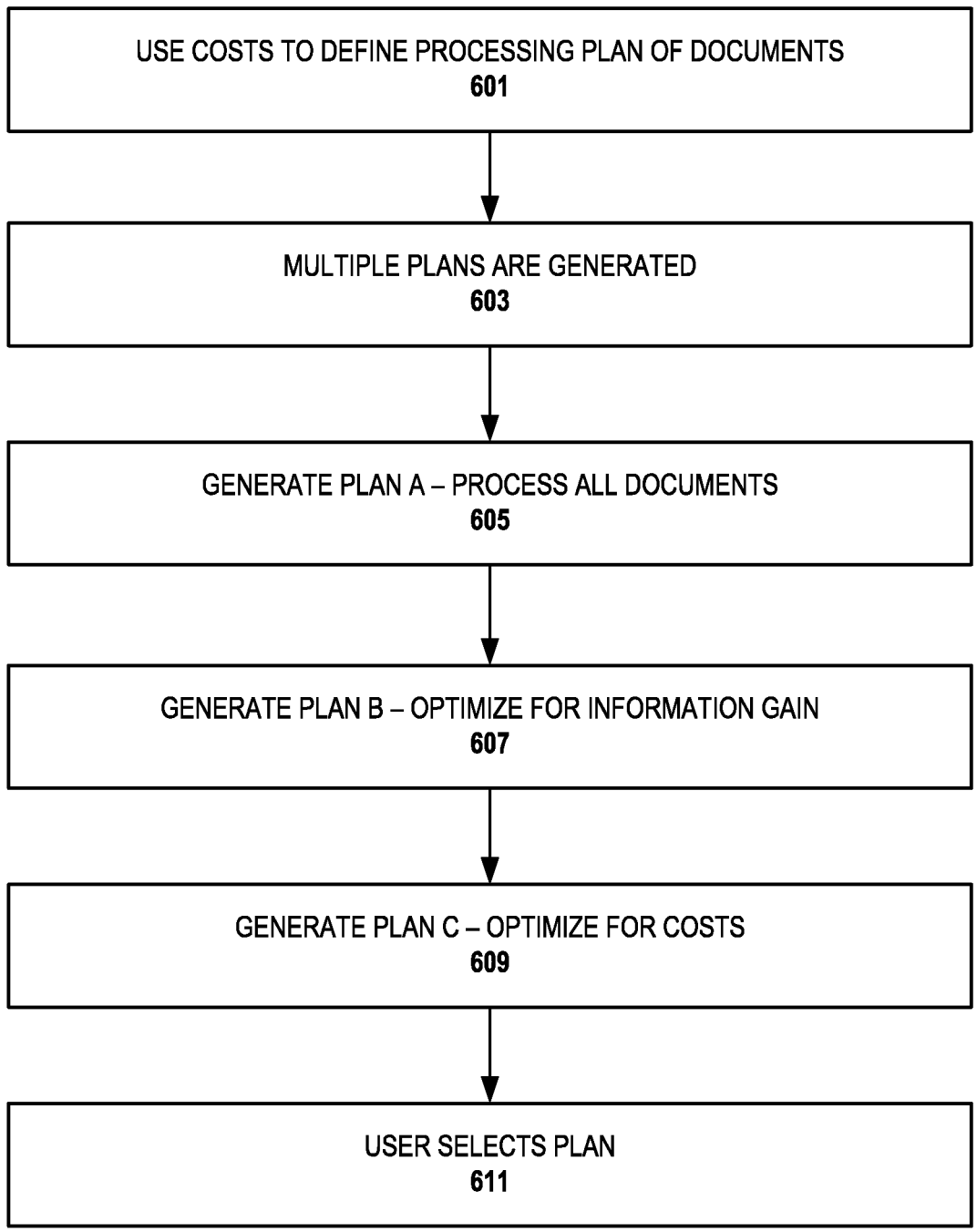
FIG. 6 is a flow diagram for developing a plan for processing the set of documents for the set of processing and extraction engines using the cost and expected information gain for each document for each engine.

FIG. 6 is a flow diagram for developing a plan for processing the set of documents for the set of processing and extraction engines using the cost and expected information gain (or other benefit) for each document for each engine. In some embodiments of the invention, the plan is for processing the set of documents for a single goal, but in other embodiments, the plan is developed so that the set of documents can be used for a plurality of goals.

In step 601, the system uses expected costs and information gain for each of the documents for each of the engines to define the processing and extraction plan for the set of documents. In embodiments of the invention, step 603, multiple processing plans are generated; these plans are user selectable in embodiments of the invention. For example, in step 605, the system generates a first plan, e.g., "Plan A" which processes all the documents. This plan is expected to have the greatest information gain, but also the highest cost. In step 607, the system generates a second plan, e.g., "Plan B" which optimizes the information gain for a given cost threshold. One method for calculating the greatest information gain is to ingest a top N documents by information gain using a threshold by number of documents or by cost. In step 609, the system generates a third plan, e.g., "Plan C", which optimizes the cost for a given minimum expected information gain. One way to optimize for cost is to find an inflection point on a benefit/cost curve. Those skilled in the art will understand that additional plans are developed in other embodiments of the invention, e.g., for different definitions of "cost", a time-based cost or an external based cost (real new dollars as opposed to sunk costs in internal assets or contractual, subscription based costs).

In step 611, the user selects a plan. In preferred embodiments of the invention, a graphical user interface presents the choices among the plans including the expected costs (including the type of costs) and as well as the expected information gain for each of the processing plans.

Figure 7:
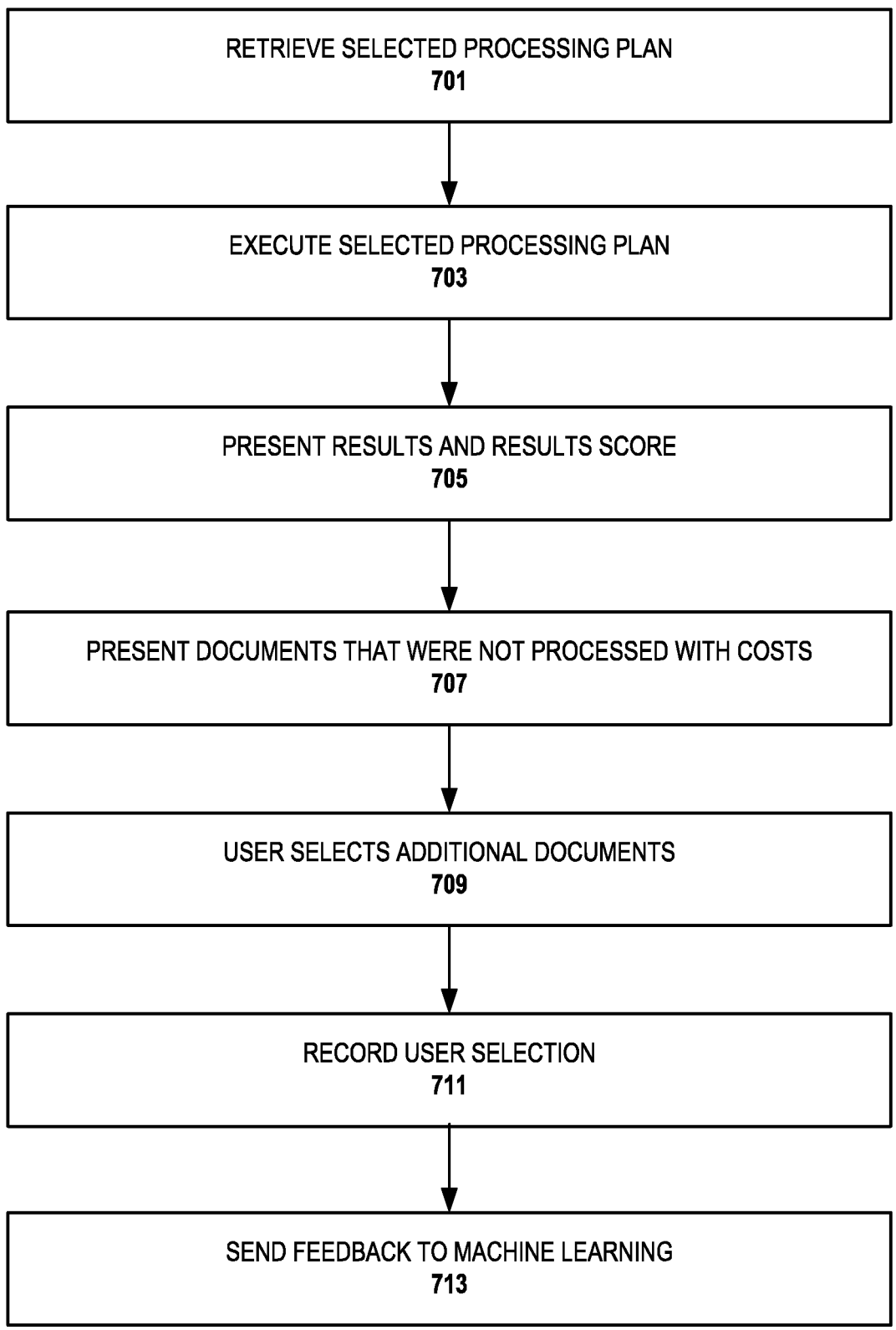
FIG. 7 is a flow diagram for executing a selected processing plan for the set of documents, for selection of additional documents and for sending feedback to machine learning concerning user selections.

FIG. 7 is a flow diagram for executing a selected processing plan for the set of documents, for selection of additional documents and for sending feedback to machine learning concerning user selections.

In step 701, the system retrieves the selected processing and extraction plan. In step 703, the system executes the selected processing plan, i.e. sends the selected documents to the appropriate internal or external extraction and processing engines. Upon receiving the results from the engines, the system evaluates the information gain for each document from the particular engine. While different embodiments of the invention use different algorithms to calculate an information gain from a set of documents, one example set of parameters would include an accuracy or F1 score. To calculate the score the machine learning model would be run twice, once with the extracted features, once without the extracted features. The difference in the results is a measure of the information gain. As another example, information gain algorithm can be executed using/not using the added features from the engine and see the scores of with and without the extracted features. In information theory and machine learning, information gain is calculated using Kullback-Leibler divergence; the amount of information gained about a random variable or signal from observing another random variable. Other algorithms are used in other embodiments of the invention.

In step 705, the system presents the extraction and processing results and calculates a cumulative results score based on the cumulative information gain. In embodiments of the invention, the individual information gain for a document from a particular engine is accessible to the user in a "drill-down" operation, e.g., a measured vs. predicted information gain is presented in embodiments of the invention.

As part of the results presentation, in step 707, the system presents documents from the set of documents that were not processed together with the expected costs and information gain if the document were processed by different internal and external engines. Based on the results, the expected cost and information gain from processing additional documents, in step 709, the user selects additional documents for processing by a selected processing engine. In step 711, the system records the user selection and executes the processing of the additional documents. In embodiments of the invention, the interface presents the information gain and the information gain difference between the first run and the second run (which includes the additional selected documents) as well as the still unprocessed documents together with the expected costs and information gain from different internal and external engines. That is, steps 707-711 are repeated in embodiments of the invention.

Once the user is satisfied with the results, in step 713, feedback is sent to machine learning so that better suggestions can be presented for future tasks. This feedback is training data for the machine learning to improve the benefit and processing plan models. The user feedback can include i) expected and actual processing cost; ii) predicted benefits, e.g., information gain; iii) Actual benefits; and iv) feature values for the metadata features, e.g., the values for document type, document size, presence of semantic markers, and other document metadata.

In embodiments of the invention, the system 1) Selects between a plurality of extraction engines; 2) Selects between a plurality of extraction engines and passage retrieval engines; or 3) Selects between extraction engine providers. For example, engine A and engine B come from one provider; engine C and engine D from a second provider. This information can be used to decide which provider can optimally process a document set as send a document set to a single provider can realize economies of time or other costs.

In other embodiments of the invention, a user is not presented a menu of selectable processing plans. The system makes the selections based on a set of rules, present costs and expected benefits. For example, the system may have the a choice between five extraction engines: 1) an internal rules-based NLP engine which is "free" from a perspective of paying a third-party "new" dollars, but may not be "free" from the perspective of computing time or taking up part of an allocation of a cloud subscription; 2) an external cloud machine learning-based NLP service which charges X$ per 50K bytes of a document; 3) an external cloud table-based extraction service which charges Z$ per page (more expensive, but better for tables); 4) an internal, zone-based OCR engine having a cost of Y$ per page (charged to the organization by another division of the organization); and 5) an external cloud-based image recognition service charging U$ per image.

Based on the expected costs and expected information gain, for a set of documents, all documents containing primarily text are sent to the internal rules-based NLP. Credit reports are sent to the external cloud-based table service. According to the document analysis, the only valuable information the credit reports are assumed to be tables. Appraisal documents which have valuable tables in first five pages (of a hundred page document) and valuable text in first ten pages are segmented. Thus, segments which contain tables are sent to the external cloud-based table service, while the next ten pages are sent to the cloud machine learning-based NLP engine.

FIG. 8 depicts a simplified embodiment of the invention having five documents, three processing engines, and three processing plans. The processing engines include a local (internal) rules based NLP engine 801, a cloud-based (external) machine learning NLP engine 803 and a cloud-based (external) table extraction engine 805. Continuing with one of the examples above, Plan A processes all the documents; Plan B is optimized for the expected information gain; and Plan C is optimized for the expected cost and a minimum threshold of information gain.

Document 807 is a memo. Memos are full of useful attributes and typically have a high information gain. Thus, for all three plans, the first memo is always processed according to a rule in one embodiment. Document 809 is also a memo. However, the NPL analysis determines that document 809 is a prior version of document 807. Thus, the second memo 809 is expected to have marginal additional information gain. Depending on the extraction plan, the cost may not be worth processing the document, according to calculations the document 809 sits right on the inflection point for Plan C. Therefore, it is not included despite a general rule that memos have high information gain.

The third and fourth documents 811 are appraisals. Appraisals are full of useful attributes and have high information gain. However, they are quite large and thus very expensive from a cost perspective. So, one rule would be that a first appraisal is processed, additional appraisals are not processed whenever cost is a key factor. In this example, redundant appraisals are removed from the processing plans. Therefore, the first appraisal is in plans A, B and C, but the second appraisal is only in plans A and B. Note that the appraisal is likely to be optimized due to its length, and the appropriate sections sent to cloud-based (external) machine learning NLP engine 803 and cloud-based (external) table extraction engine 805.

The fifth document 815 is a news clipping. According to one rule, news clippings very rarely have useful attributes. They are only processed in the most optimistic scenarios. Thus, it is included only in Plan A which processes all documents.

Embodiments of the invention may be used for many purposes. As an example, embodiments of the invention can be used to prepare a corpus for a machine learning system. In some illustrative embodiments, the machine learning system may be a question-answer (QA) system such as the IBM Watson™ QA system augmented with the mechanisms of the illustrative embodiments described hereafter. The IBM Watson™ knowledge manager system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. A level of confidence is presented that the IBM Watson™ QA system has regarding the evidence that the potential response, is correct for the input question. The invention can be used to prepare corpora for other machine learning systems.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for determining a processing plan for a set of documents comprising:
receiving a set of documents for processing;
receiving a set of processing engines wherein each processing engine has an expected benefit when processing a document with associated document metadata;
analyzing each of the set of documents to determine document metadata to be associated with the document;
determining an expected benefit for each of the documents of the set of document when the respective document is processed by a respective processing engine in the set processing engines;
determining an expected cost for processing each of the documents in each of the set of processing engines;
determining a processing plan for the set of documents, wherein the processing plan identifies a selection of documents to be run in respective processing engines of the set of processing engines based on a cost versus benefit analysis; and
executing the processing plan thereby extracting information from the identified selection of documents.

2. The method as recited in claim 1, wherein the set of processing engines comprises a set of natural language processing (NLP) engines, wherein the expected benefit is an information gain from processing the document, wherein the determining an expected benefit further comprises determining an expected for a set of goals wherein ones of the set of goals have higher priorities than other ones of the set of goals.

3. The method as recited in claim 2, wherein applying the cost versus benefit analysis to determine the processing plan for the set of documents applies the analysis to respective ones of the documents and compares document content of the respective ones to documents already selected for the processing plan is not selected for the process.

4. The method as recited in claim 1, wherein the analyzing determines the document metadata including metadata selected from a group consisting of semantic markers, document similarity, document type, document content, document size, document formatting and document quality.

5. The method as recited in claim 1, wherein a first selected portion of a first document is identified for processing by a first processing engine and a second selected portion of the first document is identified for processing by a second processing engine.

6. The method as recited in claim 3, wherein the cost versus benefit analysis includes a maximum allowable cost for processing the set of documents.

7. The method as recited in claim 2, where a respective document from the set of documents is not selected for the processing plan if insufficient information gain is expected.

8. The method as recited in claim 2, further comprising optimizing documents by removing document portions not expected to provide a threshold information gain.

9. The method as recited in claim 2, further comprising:
presenting a plurality of processing plans;
responsive to user input, executing a selected processing plan by sending the selected documents to a set of internal or external extraction and processing engines in the selected processing plan;
receiving a set of results from the engines; and
evaluating an information gain for each document from a processing engine by using a machine learning model running with the extracted features.

10. The method as recited in claim 9, further comprising training a machine learning model to more accurately predict the information gain.

11. Apparatus, comprising:
a processor;

computer memory holding computer program instructions executed by the processor for determining a processing plan for a set of documents, the computer program instructions comprising:

program code, operative to receive a set of documents for processing;

program code, operative to receive a set of processing engines wherein each processing engine has an expected benefit when processing a document with associated document metadata;

program code, operative to analyze each of the set of documents to determine document metadata to be associated with the document;

program code, operative to determine an expected benefit for each of the documents of the set of document when the respective document is processed by a respective processing engine in the set processing engines;

program code, operative to determine an expected cost for processing each of the documents in each of the set of processing engines;

program code, operative to determine a processing plan for the set of documents, wherein the processing plan identifies a selection of documents to be run in respective processing engines of the set of processing engines based on a cost versus benefit analysis; and program code, operative to execute the processing plan thereby extracting information from the identified selection of documents.

12. The apparatus as recited in claim 11, wherein the expected benefit comprises an information gain from processing the set of documents, and the apparatus further comprises program code, operative to predict the information gain based on a document type and a document date of each of the set of documents.

13. The apparatus as recited in claim 11, wherein a document type and size are used for predicting a cost of processing a document.

14. The apparatus as recited in claim 11, further comprising:

program code, operative to present a plurality of processing plans;

program code, operative to execute a selected processing plan by sending the selected documents to a set of internal or external extraction and processing engines in the selected processing plan;

program code, operative to receive a set of results from the engines; and program code, operative to evaluate an information gain for each document from a processing engine by using a machine learning model running with the extracted features.

15. A computer program product in a non-transitory computer readable medium for use in a data processing system, the computer program product holding computer program instructions executed by the data processing system for determining a processing plan for a set of documents, the computer program instructions comprising:

program code, operative to receive a set of documents for processing;

program code, operative to receive a set of processing engines wherein each processing engine has an expected benefit when processing a document with associated document metadata;

program code, operative to analyze each of the set of documents to determine document metadata to be associated with the document;

program code, operative to determine an expected benefit for each of the documents of the set of document when the respective document is processed by a respective processing engine in the set processing engines;

program code, operative to determine an expected cost for processing each of the documents in each of the set of processing engines;

program code, operative to determine a processing plan for the set of documents, wherein the processing plan identifies a selection of documents to be run in respective processing engines of the set of processing engines based on a cost versus benefit analysis; and program code, operative to execute the processing plan thereby extracting information from the identified selection of documents.

16. The computer program product as recited in claim 15, further comprising program code, operative to select a processing engine based on semantic markers and document content.

17. The computer program product as recited in claim 15, further comprising program code, operative to select a processing engine based on a goal for the processing plan.

18. The computer program product as recited in claim 16, further comprising program code, operative to select a processing engine for a document in the set of documents based on document characteristics of the document.

19. The computer program product as recited in claim 15, wherein the set of processing engines is a set of internal and external engines.

20. The computer program product as recited in claim 15, further comprising:

program code, operative to present a plurality of processing plans;

program code, operative to execute a selected processing plan by sending the selected documents to a set of internal or external extraction and processing engines in the selected processing plan;

program code, operative to receive a set of results from the engines; and program code, operative to evaluate an information gain for each document from a processing engine by using a machine learning model running with the extracted features.

* * * * *